Patented Sept. 15, 1942

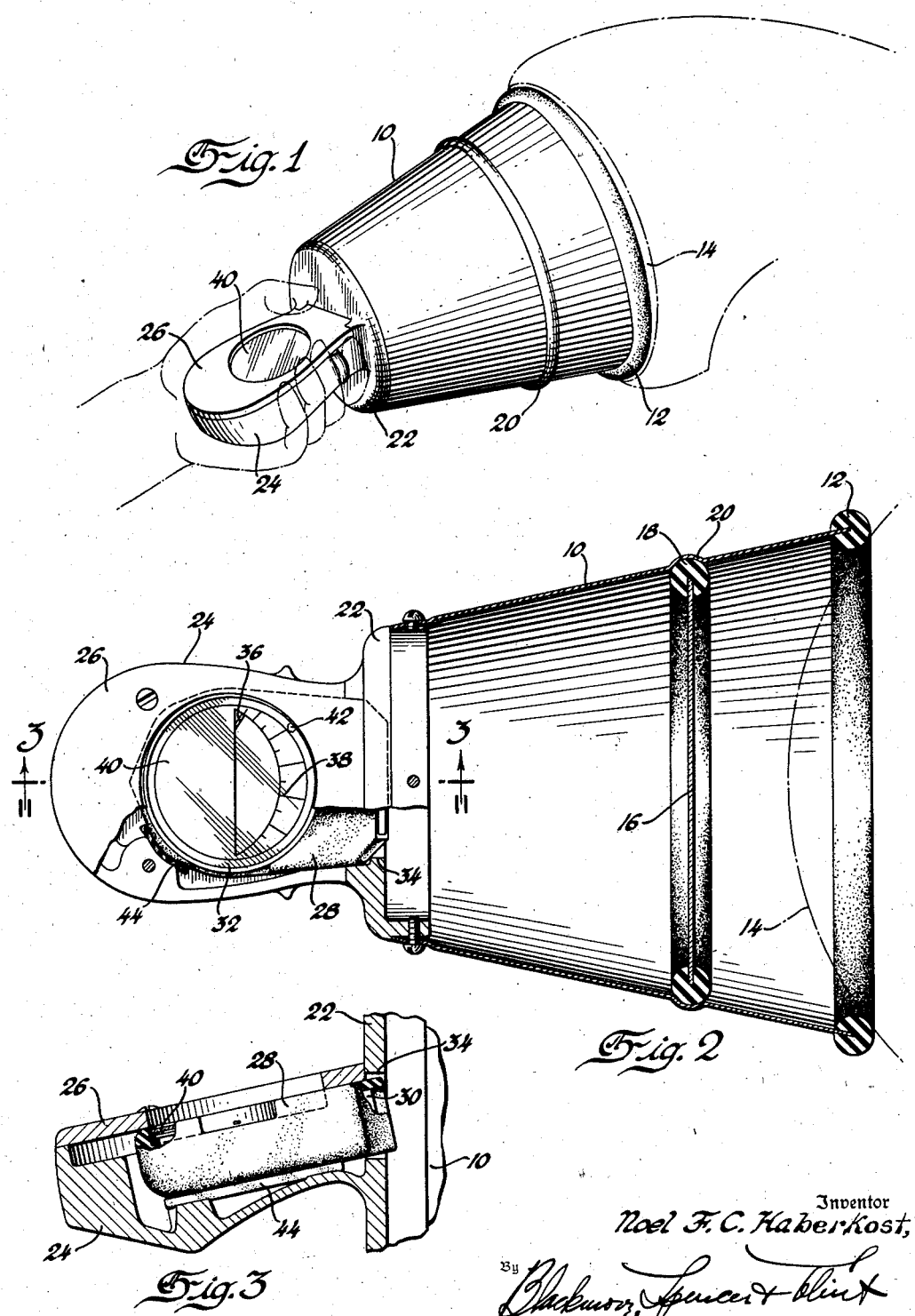

2,296,103

UNITED STATES PATENT OFFICE 2,296,103

HEADLIGHT OUTPUT METER

Noel F. C. Haberkost, Birmingham, Mich., assignor to General Motors Corporation, Detroit, Mich., a corporation of Delaware Application September 14, 1940, Serial No. 356,735

2 Claims. (Cl. 88—23)

This invention relates to a meter for measuring the light output of headlights and similar light projectors. Such devices are used in automobile service stations to determine whether headlamps are delivering the amount of light they should so that if they are not, they may be cleaned or the bulbs, reflectors or headlamps themselves—if of the "Sealed Beam" type—may be replaced to bring the light output up to the desired value.

The light output meter here disclosed is of very simple construction, consisting of a photoelectric cell arranged in a housing which is substantially light-tight except for one end which is adapted to be placed over the headlight and is of sufficient size to receive substantially its entire light output. This end is preferably covered by a translucent light diffusing member, for example a sheet of frosted glass, to distribute the light evenly within the interior of the housing so that the exposed light-sensitive element of the photocell will receive a degree of illumination which is an average of the light output of the headlight and varies substantially in direct proportion to that output. The interior of the housing is also preferably provided with a good light-diffusing surface to assist in accomplishing this result.

The tester is especially marked by convenience and simplicity of design. An important feature is the location of the instrument, usually a microammeter, which indicates the effect of light on the photocell, in the handle of the tester thereby insuring that when the tester is held in proper position to measure the light output of the headlight the instrument is in convenient position for inspection. The tester is simply constructed from parts which may be manufactured at low cost and readily assembled and these parts are equipped with suitable gaskets which facilitate assembly and prevent the admission of stray light.

In the drawing:

Figure 1 is a perspective view indicating how my improved headlight output meter is to be used.

Figure 2 is a top plan view of the meter with parts in section.

Figure 3 is a view, partly in section, along the line 3—3 of Figure 2.

10 indicates a suitable housing preferably made of sheet metal and of frusto-conical shape as shown. To the forward end of housing 10 is secured a gasket 12 of rubber or other yieldable material. The gasket is adapted to engage the front of the headlight, preferably the outer portion of the lens as indicated at 14 in Figure 1. It will be found desirable to make the diameter of the gasket 12 slightly less than the diameter of the exposed portion of the usual headlight lens so that the ring of light coming through the uncovered outer periphery of the lens will serve as a guide in centering the meter on the headlight. Within the housing 10 is provided a suitable translucent diffusing screen 16 preferably of frosted glass. The screen is secured in place in any suitable manner so that all light entering the housing must pass through the screen. As shown in Figure 2 the screen 16 is seated in a suitable groove in gasket 18 which is in turn seated in groove 20 formed in the interior of the housing. This provides a convenient and at the same time a light-tight assembly. The opposite end of housing 10 is closed by a member 22 preferably shaped to provide a handle portion 24 which may be formed so as to be conveniently gripped as shown in Figure 1. The handle portion 24 is preferably hollow and is provided with a cover 26. Secured within the hollow handle is a unit 28 consisting of a light sensitive element 30 and an indicating instrument 32, preferably a microammeter, electrically connected to the element 30 so as to measure the amount of light received by the element. Light sensitive element 30 projects through opening 34 in member 22 into the housing so that it is exposed to the light from the headlamp passing through the diffusing screen 16.

The unit 28 may be of any suitable type now on the market and forms no part of the present invention except in combination with other elements as hereinafter claimed. Microammeter 32 is provided with pointer 36 cooperating with a suitable scale 38. Glass cover 40 may, if desired, be provided with indexing element 42 and may be mounted for rotation so that the indexing element 42 may be moved to proper position to indicate on the scale 38 the normal light output of the lamp being tested.

In order to protect unit 28 against injury it is preferably mounted on rubber as indicated at 44 and, if desired, similar cushioning material may be provided between cover 26 and the unit.

With the tester positioned over the headlight as indicated in Figure 1, substantially the entire light output of the headlight passes through diffusing screen 16 so that the light sensitive element 30 receives an amount of light which is an average of the total output and varies substantially in accordance with that output. To further insure that the light sensitive element 30 shall receive a quantity of light corresponding to the average light output, the interior of housing 10 may be provided with a light diffusing surface as by painting or enameling it white. The light falling on element 30 produces a minute current which deflects needle 36 of the microammeter 32 thereby measuring the light output. If needle 36 comes up to the normal light output mark indicated by index member 42 the headlamp is in satisfactory condition. If it falls below that point it is an indication that the headlamp requires thorough cleaning, a new reflector, a new bulb or complete replacement to restore the light output to its desired value.

Various modifications will occur to those skilled in the art. Thus it may prove desirable to make housing 10 and member 22 of one-piece rubber construction.

I claim:

1. A lightweight manually-supported appliance for testing the beam intensity of vehicle headlamps, comprising: a combined handle and meter casing provided with a window in its top wall, the other walls of said casing being of a small size and configuration such as to lie flatwise in the horizontally-extended palm of the user's hand and be naturally firmly clutchable by the fingers thereof without obscuring the user's view of said window, a light meter disposed in said casing with its indicating means visible through said window and with its light-sensitive cell element exposable to the light source through an opening in the forward wall of said casing, and a thin opaque bell-shaped light-directing member attached to said forward casing wall and having a divergent skirt terminating in a mouth of sufficient size to insure masking of the major portion of a conventional headlamp lens when the appliance is manually horizontally supported in use and to enable steady vertical support of the appliance with its skirt mouth disposed in light-excluding contact with the surface of a bench or the like when not in actual use.

2. A structure as set forth in claim 1 wherein the exposed surface of the light-sensitive cell element is elongate in form and has its major axis horizontally disposed when the appliance handle is flatwise supported in the horizontally-extended palm of the user's hand.

NOEL F. C. HABERKOST.